July 5, 1932.                K. A. EDSTROM                1,865,683
STEREOSCOPE
Filed Feb. 18, 1929      2 Sheets-Sheet 1
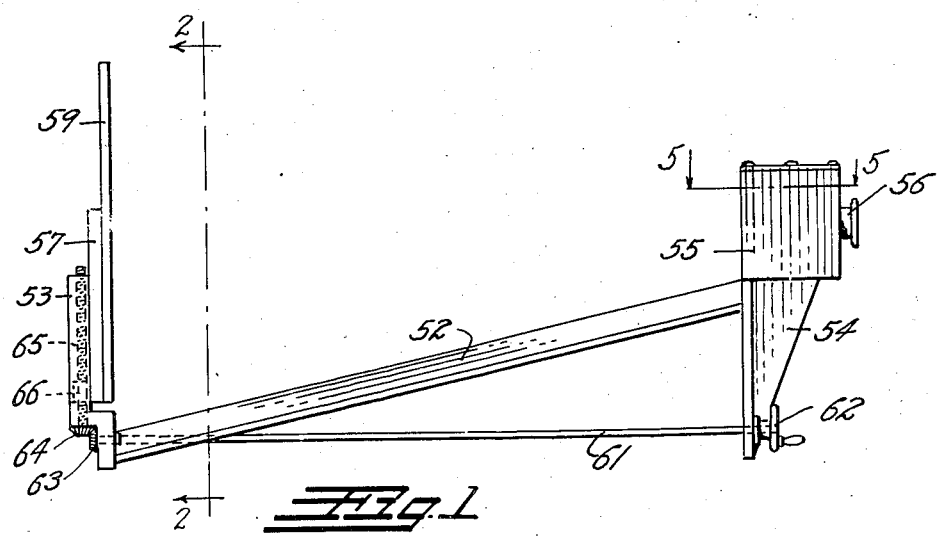
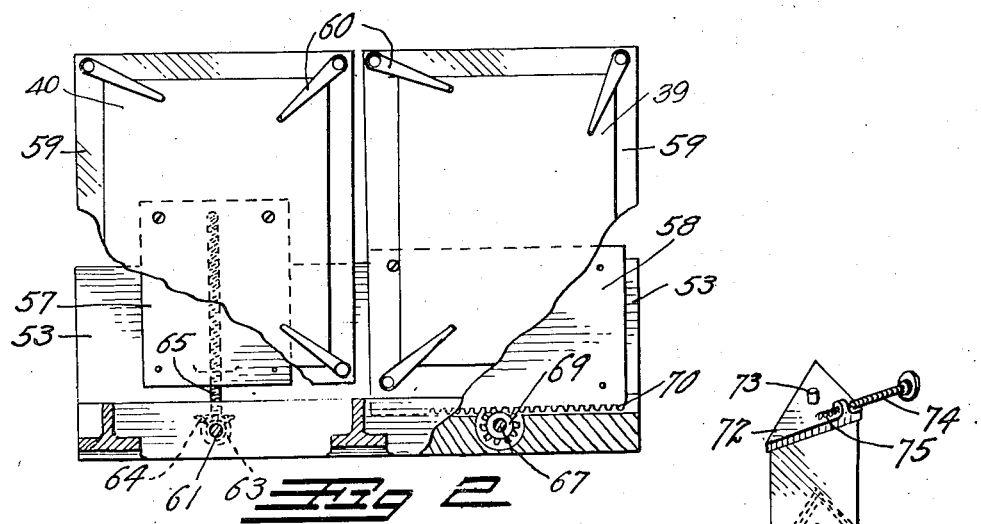
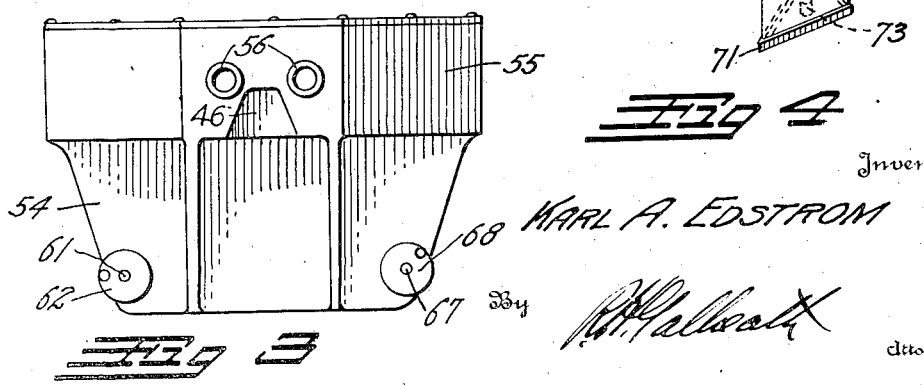
Inventor
KARL A. EDSTROM
By
Attorney July 5, 1932.　　K. A. EDSTROM　　1,865,683
STEREOSCOPE
Filed Feb. 18, 1929　　2 Sheets-Sheet 2

Inventor
KARL A. EDSTROM
By
Attorney

Patented July 5, 1932                                                1,865,683

UNITED STATES PATENT OFFICE

KARL A. EDSTROM, OF DENVER, COLORADO

STEREOSCOPE

Application filed February 18, 1929. Serial No. 340,675.

This invention relates to a device for viewing stereoscopic pictures. The principal object of the invention is to provide a comparatively small close ranged device which will give both stereoscopic effect and magnification.

Another object is to provide a prismatic system which will give an apparent stereoscopic image at comparatively close focus so that details of the image may be closely studied.

A further object of the invention is to provide an efficient carriage whereby the operator may move the views either horizontally or vertically so as to view any particular portion thereof, and so that the two views can be adjusted and aligned to obtain a perfect stereoscopic picture.

Other objects and advantages reside in the detail construction of the invention, which is designed for simplicity, economy, and efficiency. These will become more apparent from the following description.

In the following detailed description of the invention, reference is had to the accompanying drawings which form a part hereof. Like numerals refer to like parts in all views of the drawings and throughout the description.

In the drawings:

Fig. 1 is a side elevation of the complete device.

Fig. 2 is a vertical section therethrough taken on the line 2—2, Fig. 1.

Fig. 3 is a front elevation thereof.

Fig. 4 illustrates a method by means of which the prisms may be adjusted for alignment, if desired.

Figure 5:
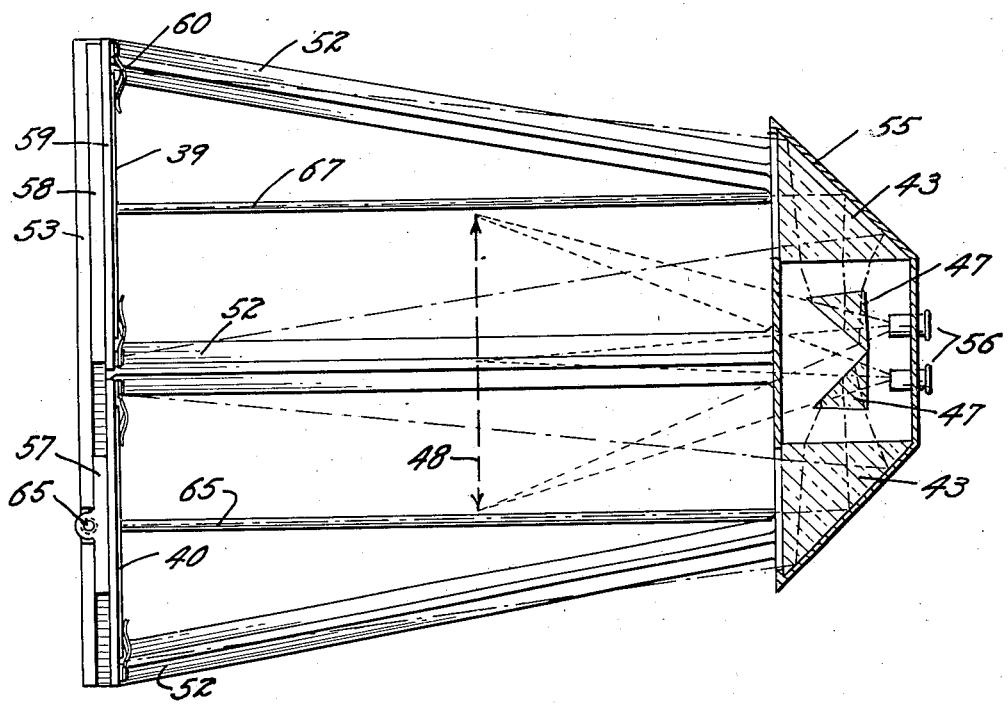
Fig. 5 is a plan view with the prism box shown in section on the line 5—5, Fig. 1.

In the drawings, the right hand view is illustrated at 39 and the left hand view at 40. As is usual in stereoscopic work, the two views are taken from positions spaced apart approximately the distance of the natural eye-balls.

The stereoscopic portion of the device comprises a casing 55 carrying at each of its extremities a large right angle prism 43. The rear of the casing 42 is provided with eye pieces 56 and with a depression 46 for the nose and face of the operator.

Immediately in front of each of the eye pieces, a relatively smaller prism 47 is placed. The prisms 47 are not right angle prisms but are cut on an angle which will cause the apparent lines of sight to focus on an apparent image, indicated at 48, Fig. 3, approximately ten inches in front of the eyes.

In use, the operator places his eyes before the eye pieces 56. He sees the view 39 with the left eye and the view 40 with the right eye, superimposed upon each other at the position of the apparent image 48, Fig. 3, the image appearing in stereoscopic relief.

A supporting frame 52 carries at one extremity a viewing frame 53 and at its other extremity a prism frame 54. The prism frame 54 supports the casing 55 and the prisms 43 and 47. The view frame 53 supports two adjustably mounted view plates 57 and 58, on each of which is mounted a view board 59 to which the print or pictures 39 and 40 can be attached by means of spring clips 60.

Adjustments are provided to allow the plate 57 to be moved vertically and the plate 58 to be moved horizontally. These movements are accomplished as follows: A control rod 61 extends from a control handle 62 on the prism frame 54 to a bevel gear 63 in the view frame. The bevel gear 63 cooperates with a second bevel gear 64 to rotate a threaded shaft 65. The shaft 65 is threaded through an ear 66 on the rear of the plate 57. A second control rod 67 extends from a control handle 68 on the prism frame 54 to a pinion 69 in the view frame 53. The pinion 69 cooperates with a rack 70 along the bottom of the plate 58.

Thus, the operator can, by rotation of the handle 62, move the left hand view upwardly or downwardly to align it vertically with the right hand view. He can then, by rotation of the handle 68, move the right hand view to the right or left to align it horizontally with the left hand view. By this arrangement absolute alignment of the two views can be quickly and easily obtained by the operator.

If desired, objective lenses may be placed in the eye-pieces 56 so that rotation of the eye-pieces can be used, as is common in microscopic and telescopic constructions, to focus the lenses to obtain a magnified view.

If an adjustment of the stereoscopic effect is desired, one of the larger prisms can be adjustably mounted so that the angle of reflection or the size of the apparent image can be controlled. This may be accomplished by a mechanism such as illustrated in Fig. 4. The prism is mounted between two plates 71 and 72 each provided with a pivot lug 73. The prisms can be rotated about the pivots by means of an adjusting screw 74 which will rotate it in one direction and a spring 75 which will rotate it in the opposite direction.

While a specific form of the improvement has been described and illustrated herein, it is desired to be understood that the same may be varied, within the scope of the appended claims, without departing from the spirit of the invention.

Having thus described the invention, what I claim and desire to secure by Letters Patent is:

1. A device for viewing a pair of stereoscopically related views comprising: a supporting frame; a vertically placed view frame carried in one extremity of said supporting frame; a prism frame carried at the other extremity of said supporting frame; a series of prisms supported by said prism frame; a vertically placed view support carried on said view frame; a threaded rod, the rotation of which moves said view support vertically; a second view support carried on said view frame; and means for moving said second view support horizontally, said means comprising: a rack connected with said second view support; and a pinion adapted to cooperate with said rack to move said view support horizontally.

2. A stereoscope for viewing a pair of stereoscopically related views comprising: a prism box; stereoscopic prisms within said box; eye pieces opening to said box; a supporting member projecting downwardly from said prism box; a supporting frame extending forwardly from said prism box; a view support extending vertically upward from the forward extremity of said supporting frame; and a pair of view boards for carrying said views, one of said view boards being mounted on said view frame for vertical adjustment, the other view board being mounted for horizontal adjustment.

3. A stereoscope for viewing a pair of stereoscopically related views comprising: a prism box; stereoscopic prisms within said box; eye pieces opening to said box; a supporting member projecting downwardly from said prism box; a supporting frame extending forwardly from said prism box; a view support extending vertically upward from the forward extremity of said supporting frame; a pair of view boards for carrying said views, one of said view boards being mounted on said view frame for vertical adjustment, the other view board being mounted for horizontal adjustment; and means for operating said adjustments from the operator's position at said prism box.

4. A stereoscope for viewing a pair of stereoscopically related views comprising: a prism box; stereoscopic prism within said box; eye pieces opening to said box; a supporting member projecting downwardly from said prism box; a supporting frame extending forwardly from said prism box; a view support extending vertically upward from the forward extremity of said supporting frame; a pair of view boards for carrying said views, one of said view boards being mounted on said view frame for vertical adjustment, the other view board being mounted for horizontal adjustment; and means for operating said adjustments from the operator's position at said prism box, said means comprising: shafts extending from said view frame and terminating at said supporting frame and handles carried by said shafts at said supporting frame.

5. A stereoscope for viewing a pair of stereoscopically related views comprising: a prism box; stereoscopic prisms within said box; eye pieces opening to said box; a supporting member projecting downwardly from said prism box; a supporting frame extending forwardly from said prism box; a view support extending vertically upward from the forward extremity of said supporting frame; a pair of view boards for carrying said views, one of said view boards being mounted on said view frame for vertical adjustment, the other view board being mounted for horizontal adjustment; and means for operating said adjustments from the operator's position at said prism box, said means comprising: a first shaft extending from said prism box to said view frame and arranged to rotate a threaded shaft for raising or lowering said vertically adjustable view board; a second shaft extending from said view box to said view frame; a pinion carried by said second shaft and a rack connected with said second view board so that rotation of said second shaft will move it laterally.

In testimony whereof, I affix my signature.

KARL A. EDSTROM.